May 12, 1970  J. F. ROGET ET AL  3,511,615
STEPWISE REACTOR
Filed June 1, 1966  2 Sheets-Sheet 1
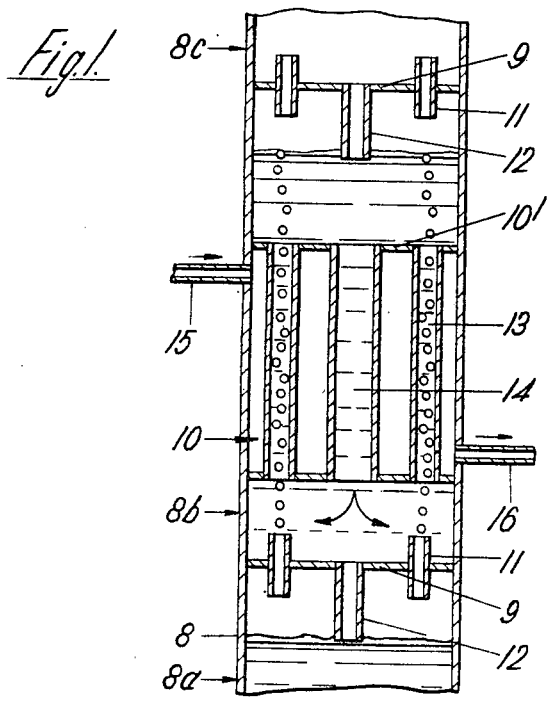
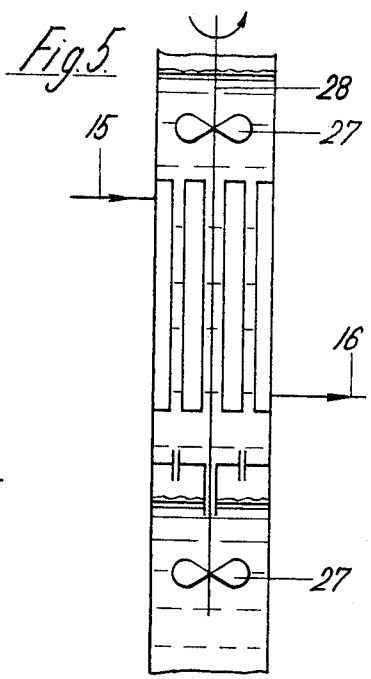

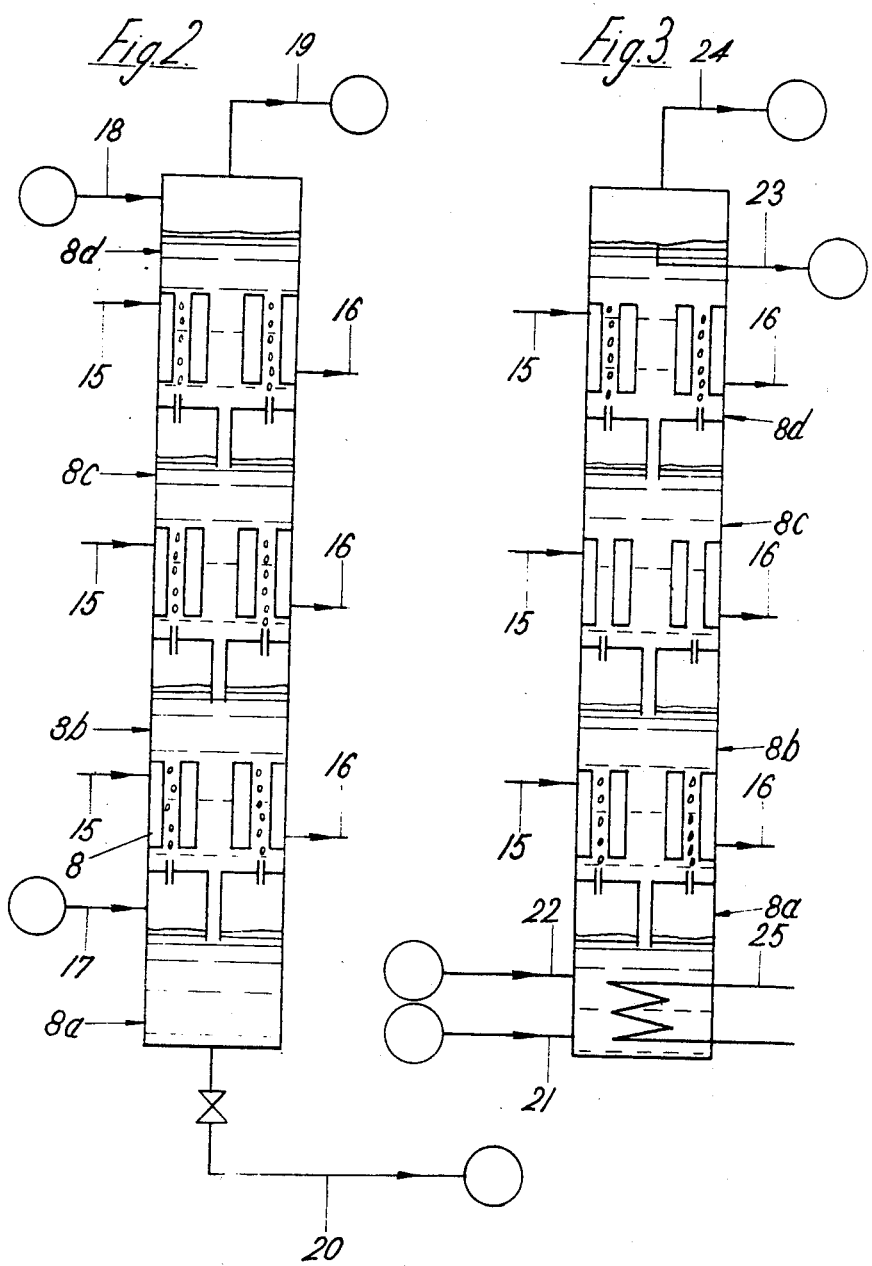

United States Patent Office 3,511,615
Patented May 12, 1970

3,511,615
STEPWISE REACTOR
Jean François Roget and Philippe Yvon Tarbouriech, Lyon, France, assignors to Rhone-Poulenc S.A., Paris, France, a French body corporate
Filed June 1, 1966, Ser. No. 554,566
Claims priority, application France, June 9, 1965, 20,073
Int. Cl. B01j *1/00*
U.S. Cl. 23—283                                    5 Claims

ABSTRACT OF THE DISCLOSURE

Multistage reactor including a vertical column divided in stages by horizontal separation plates. Each stage includes a bundle of vertical tubes which serve for the ascent and descent of liquid within such stage. Through-pipes are provided in each separation plate for the passage of gas or vapour from a lower stage to the upper stage, these through-pipes being coaxial with the liquid ascent tubes of the bundles of tubes with the upper stage. A down-tube for the passage of liquid leads from one stage to the stage below and extends downwardly partially into the space above the bundle of tubes immediately below the plate in question.

---

The present invention relates to a multistage reactor suitable for carrying out reactions which take place continuously at relatively low speeds, and for which it is essential to achieve high degrees of conversion of the reagents.

Multistage reactors consist of a series of stages in each of which one attempts to maintain the concentrations of the various constituents the same at all points of one and the same compartment, so that the product leaving each stage has the same composition as the product within such stage.

Different types of multistage reactors used for various reactions already exist. The results which they yield vary depending on the type of reaction being carried out and the characteristics of the products being reacted. A particularly delicate case is that of the reaction between liquids in which vapour is given off, and that of reactions between a gas and a liquid with the possible presence of a more or less finely divided solid arising from the reaction itself or introduced with the reagents as a catalyst.

Reactions such as those envisaged above have already been carried out in various types of multistage reactors whose stages may be either superimposed or arranged in separate units. Generally, however, the equipment in use up to the present time, does not always allow a satisfactory homogenisation of the liquid and gaseous phases, or satisfactory heat exchange, to be obtained.

According to the invention there is provided a multi-stage reactor, for continuously carrying out reactions between gases and liquids or between liquids but in presence of a gaseous or vapor phase, a such reactor comprising a plurality of stages positioned one on top of another, each stage including a bundle of vertically arranged tubes positioned to provide the circulation of gases and liquids within such stage, each stage being separated from the adjacent stage by a plate, a plurality of nozzles passing through each plate immediately below the tubes providing the passages for the acsent of the fluid, and at least one downtube providing a passage of the liquid to or from the stage below, this tube extending into the upper space of the stage immediately below such plate.

In order that the invention may more readily be understood, the following description is given, merely by way of example, reference being made to the accompanying drawings, in which:

FIG. 1 is an axial section, of one stage of one embodiment of multistage reactor according to the invention;

FIG. 2 is a schematic view, showing a reactor incorporating three stages as illustrated in FIG. 1, in use as for a reaction between a liquid and a gas in counter-current flow;

FIG. 3 is a view similar to FIG. 2, of a reactor in use for a reaction between two liquids;

FIG. 4 is a view similar to FIG. 2 of a second embodiment of one stage of a reactor according to the invention; and FIG. 5 is a view similar to FIG. 2 of a third embodiment of one stage of a reactor according to the invention.

FIG. 1 illustrates one stage of a reactor according to the invention. The reactor comprises a vertically extending cylindrical vessel 8 which is divided into a plurality of stages 8a, 8b and 8c, by a number of horizontally extending separating plates 9. Each stage, for example the stage 8b, illustrated in FIG. 1, includes a bundle of tubes 10, such bundle being arranged slightly below the centre of the stage, so that the space above the bundle is larger than the space below the bundle in such stage. The bundle of tubes comprises an upper and lower supporting plate 10′ between which extend a plurality of outer tubes 13 and a single central tube 14.

Each of the separating plates 9 has, extending therethrough, immediately below each tube 13, a nozzle 11. In the centre of each plate, immediately below the central tube 14, is a downtube 12 passing into the upper portion of the stage below.

In order to heat or cool the reaction occurring in each stage, the heating or cooling liquid is introduced and expelled through tubes 15 and 16, into the space between the two plates 10′ of each bundle, so that the heating or cooling fluid can flow in contact with the outside of the tubes 13 and 14.

Where a reactor consisting of stages, like that of FIG. 1, is used for reactions comprising a liquid phase and a gaseous or vapour phase, such as the reactions considered above, the operation of the reactor may be controlled in such a way that, in each stage, the liquid does not exceed a certain level between the upper separating plate and the lower orifice of the central downtube 12 into this plate, thus leaving a sufficient space in the upper part of the stage where the gas or vapour which has traversed the stage can collect. This gas or vapour passes from one stage to the stage immediately above by passing through the nozzles 11, then emulsifies the liquid it encounters and causes it to rise in the ascent tubes 13 of the bundle 10 above, thus in each stage causing a circulation of liquid between the lower and upper spaces, whatever may otherwise be the direction of overall flow of the liquid across the reactor.

The new reactor of the invention thus consists of an assembly of stages analogous to that shown in FIG. 1, and additionally there are at the bottom and top the usual inlets and outlets for the reagents and the products resulting from the reaction. FIG. 2 illustrates an arrangement for the reaction of gas and liquid in counter-current and comprising four stages 8a, 8b, 8c and 8d, such stages all being of the form illustrated in FIG. 1. Supply and exhaust tubes 18 and 20 respectively are provided at the top and bottom of the reactor for the flow of liquid and supply and exhaust tubes 17 and 19 respectively, are provided at the bottom and top of the reactor for the flow of gas or vapour.

FIG. 3 schematically shows an analogous reactor for a reaction between liquids flowing concurrently, fed in at the bottom of the reactor via pipes 21 and 22 and heated at 25 to give rise to a gaseous compound which is removed at 24, the liquid compound being removed at 23.

The reactor of the invention may optionally also, like all multistage reactors, comprise complementary feed pipes (not shown) within the stages to make it possible to divide the feed along the length of the reactor according to the reaction conditions.

As a result of the intense circulation which takes place within each stage under the action of the current of gas or vapour, the reactor which has been described allows remarkable homogeneity to be achieved within each stage, and improves material exchange and heat exchange. It can operate equally where the liquid phase contains fine solid particles in suspension. Where these particles follow the liquid in its overall flow movement, the stages may be designed as shown in FIG. 1. If the solid particles tend to settle out under the working conditions, then stages such as that shown in FIG. 4 are preferably used where the only difference from the FIG. 1 construction is the provision of funnel shaped downpipes 26.

If it should be necessary for very viscous media, the reactor may furthermore be furnished with an auxiliary stirrer system comprising paddles 27 mounted for rotation on shaft 28 as shown in FIG. 5, acting in each stage on the liquid which is above the bundle of tubes.

The reactor of the invention may be constructed in any size, and for reactions at atmospheric pressure or for reactions under pressure. It may be used for various operations of organic chemistry for example for oxidation, reduction, esterification, hydrolysis and polycondensation.

We claim:

1. A multistage reactor for continuously carrying out, either concurrently or in countercurrent, reactions between gases and liquids or between liquids but in the presence of a gaseous or vapor phase with the possible presence of a finely divided solid, said reactor comprising in combination a vertical column, a plurality of horizontal separation plates dividing said column into a plurality of stages, each of said separation plates having therein a plurality of throughpipes extending therethrough and above each said separation plate and at least one down-tube opening into each of said separation plates and extending downwardly therefrom, inlet and outlet means communicating with said vertical column and disposed, respectively, above and below the uppermost and lowermost stages as defined by said horizontal separation plates, a bundle of vertically disposed tubes in each of said stages, each of said bundles including ascent tubes and at least one descent tube for the ascent and descent of liquid therein, respectively, each of said plurality of through-pipes being placed in its respective separation plate as to be coaxial with one of said ascent tubes in the bundle of tubes in the stage immediately thereabove for directing flow from the stage immediately therebelow upwardly through the ascent tube immediately thereabove, a plurality of spaces, each said space being defined by one of said separation plates and the one of said bundles of tubes in the stage immediately therebelow, and each said down-tube being placed in said separation plate associated therewith and having a length such that said down-tube extends into said space immediately therebelow and is substantially coaxial with said descent tube in the bundle of tubes of said stage immediately therebelow.

2. A reactor according to claim 1 wherein each down-tube is positioned centrally of its associated plate.

3. A reactor according to claim 1 wherein the down-tube is funnel-shaped.

4. A reactor according to claim 1 and including a mechanical agitator above the bundle of tubes in each stage and below the down-tube in the separation plate immediately thereabove.

5. A reactor according to claim 1 wherein each bundle of tubes has associated therewith means for the circulation of a heating or cooling fluid around the tubes of a bundle.

References Cited

UNITED STATES PATENTS 3,167,531 1/1965 Parker et al. _____ 23—283 XR
3,364,988 1/1968 Hartmann _____ 165—85

JAMES H. TAYMAN, JR., Primary Examiner

U.S. Cl. X.R.

23—260; 196—14.52; 260—687, 689, 695, 700